(12) United States Patent
Geithner (10) Patent No.: US 9,075,786 B2
(45) Date of Patent: Jul. 7, 2015

(54) USER INTERFACE UTILIZING GENERIC FIELD FOR MULTIPLE INPUT TYPES

(75) Inventor: Ralf Wolfgang Geithner, Schwetzingen (DE)

(73) Assignee: SAP SE, Walldorf (DE)

( * ) Notice: Subject to any disclaimer, the term of this patent is extended or adjusted under 35 U.S.C. 154(b) by 369 days.

(21) Appl. No.: 13/531,892

(22) Filed: Jun. 25, 2012

(65) Prior Publication Data

US 2013/0346854 A1  Dec. 26, 2013

(51) Int. Cl.
| | |
|---|---|
| G06F 17/00 | (2006.01) |
| G06F 3/041 | (2006.01) |
| G06F 17/24 | (2006.01) |
| G06F 17/30 | (2006.01) |

(52) U.S. Cl.
CPC ........ *G06F 17/243* (2013.01); *G06F 17/30398* (2013.01)

(58) Field of Classification Search
CPC ... G06F 8/38; G06F 17/243; G06F 17/30398; G06F 17/30392
USPC .......... 707/805; 715/221, 222, 223, 224, 225, 715/226
See application file for complete search history.

(56) References Cited

U.S. PATENT DOCUMENTS

| | | | | | |
|---|---|---|---|---|---|
| 4,545,023 | A | * | 10/1985 | Mizzi ............................. | 708/143 |
| 5,761,485 | A | * | 6/1998 | Munyan ......................... | 715/839 |
| 8,347,226 | B2 | * | 1/2013 | Windl ............................. | 715/810 |
| 2003/0093285 | A1 | | 5/2003 | Colace et al. | |
| 2004/0187090 | A1 | * | 9/2004 | Meacham ....................... | 717/103 |
| 2005/0234959 | A1 | * | 10/2005 | Ronnewinkel et al. ........ | 707/102 |
| 2007/0130505 | A1 | * | 6/2007 | Woods ............................ | 715/505 |
| 2010/0223286 | A1 | * | 9/2010 | Arcuri et al. ................... | 707/769 |
| 2012/0110449 | A1 | * | 5/2012 | Frey ................................ | 715/708 |
| 2013/0222373 | A1 | * | 8/2013 | Weinstein et al. ............. | 345/419 |
| 2013/0290824 | A1 | * | 10/2013 | Lukawski et al. ............. | 715/222 |

OTHER PUBLICATIONS

Extended European Search Report dated Oct. 29, 2013 for European Patent Application No. 13003068.7.
Internet article entitled "Dropdown Box", from SAP Library-Business Intelligence), from http://help.sap.com/saphelp_nw70/helpdata/en/b0/68e360b60246119be8ea8b7f33d24b/content.htm. Printed Jun. 25, 2012.
Internet article entitled "Creating a Dropdown List Box", from SAP Library-HCM Processes and Forms), from http://help.sap.com/erp2005_ehp_04/helpdata/en/43/7a667df4ad6fc9e10000000a1553f6/content.htm. Printed Jun. 25, 2012.

* cited by examiner

*Primary Examiner* — Thomas Lee
*Assistant Examiner* — Chad Erdman
(74) *Attorney, Agent, or Firm* — Fountainhead Law Group PC (57) ABSTRACT

A user interface features a single, generic input field configured to receive multiple types of available input information. In various embodiments, the generic input field of the interface may include a drop-down menu offering user selection from a plurality of available input types. The interface may reduce an amount of time consuming, error-prone manual activity required to navigate between, select, and enter data into multiple fields located in different regions of a screen. Embodiments may be particularly suited for interfaces with portable devices having small displays and cramped input environments (e.g. small keys, touchscreens, touchpads).

11 Claims, 6 Drawing Sheets

USER INTERFACE UTILIZING GENERIC FIELD FOR MULTIPLE INPUT TYPES

BACKGROUND

Embodiments of the present invention relate to user interfaces, and in particular, to the manner in which data is input by a user into a user interface.

Unless otherwise indicated herein, the approaches described in this section are not prior art to the claims in this application and are not admitted to be prior art by inclusion in this section.

Conventionally, when filling out a complex business document, a user must manually access a plurality of input fields and then enter data thereto. Often, one or more of these input fields are text fields requiring a user to type in characters utilizing a keyboard.

Thus an input sequence to a conventional user interface may typically comprise:

manually navigating to the input field in the document with a mouse or other input device (e.g. TAB key of a keyboard);

entering the desired text in the field; and then manually navigating to the next field by using the mouse or other input device.

Such activities involve substantial physical activity and coordination, with the user having to visually locate multiple input fields, navigate to access those input fields (e.g. by pointing, clicking), and then enter relevant information into those input fields (e.g. by typing).

Furthermore, some input fields may require entry of mandatory data. These mandatory input fields could be distributed across a complex business document, or hidden on inactive screens of a multi-screen application.

Manual activity in identifying and navigating to a plurality of input fields may be both time-consuming and error-prone, particularly where the user is outside of a standard workplace environment (e.g. on a train) and/or attempting to enter relevant information into a hand-held device having a small screen and keyboard (e.g. a smart phone).

The present disclosure addresses these and other issues by providing user interfaces having a generic input field.

SUMMARY

A user interface features a single, generic input field configured to receive multiple types of available input information. In various embodiments, the generic input field of the interface may include a drop-down menu offering user selection from a plurality of available input types. The interface may reduce an amount of time consuming, error-prone manual activity required to navigate between, select, and enter data into multiple fields located in different regions of a screen. Embodiments may be particularly suited for interfaces with portable devices having small displays and cramped input environments (e.g. small keys, touchscreens, touchpads).

An embodiment of a computer-implemented method comprises providing an interface engine in communication with a stored document comprising a plurality of available input information types, and causing the interface engine to display a single input field on a screen. In response to a first input to the single input field, the view engine is caused to display a list of the plurality of available input information types. In response to a second input to the list, causing the interface engine to enter a particular input information type into the stored document.

An embodiment of a non-transitory computer readable storage medium embodies a computer program for performing a method, said method comprising providing an interface engine in communication with a stored document comprising a plurality of available input information types, and causing the interface engine to display a single input field on a screen. In response to a first input to the single input field, the view engine is caused to display a list of the plurality of available input information types. In response to a second input to the list, causing the interface engine to enter a particular input information type into the stored document.

An embodiment of a computer system comprises one or more processors and a software program executable on said computer system. The software program is configured to provide an interface engine in communication with a stored document comprising a plurality of available input information types, and to cause the interface engine to display a single input field on a screen. In response to a first input to the single input field, the view engine is caused to display a list of the plurality of available input information types. In response to a second input to the list, the interface engine is caused to enter a particular input information type into the stored document.

According to certain embodiments, the interface engine may display a required input information type in the list, in a manner different from an optional input information type.

In some embodiments, the interface engine may display the required input information type in the list, in a color different from the optional input information type.

In particular embodiments the single input field may comprise a drop arrow, and the first input may comprise selecting the drop arrow.

According to some embodiments, the stored document may comprise a database.

Various embodiments may further comprise displaying an icon next to previously-selected input information types of the list.

In some embodiments the user may access the input field via a touchscreen.

The following detailed description and accompanying drawings provide a better understanding of the nature and advantages of particular embodiments.

DETAILED DESCRIPTION

Described herein are techniques for providing a user interface. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
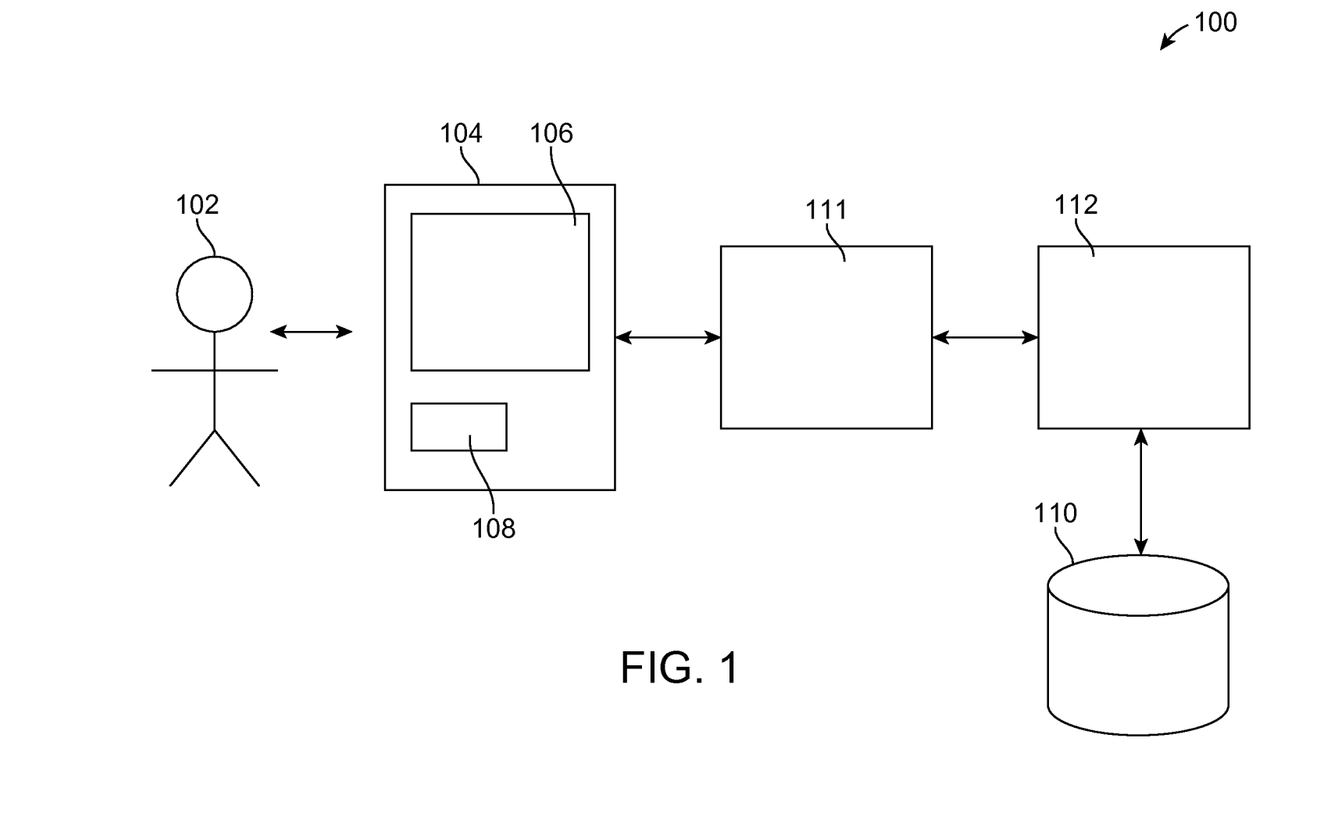
FIG. 1 shows a simplified view of a user interface according to an embodiment.

FIG. 1 shows a simplified view of a system 100 for providing an interface according to an embodiment. In particular, a user 102 is configured with a device 104 comprising a display 106 and an input mechanism 108. Examples of such input mechanisms include but are not limited to a touch screen, touch pad, a mouse, a keypad, or a keyboard.

The user seeks to use the device to access, create, and/or edit information stored in data warehouse 110, via an interface 111. Accordingly a processor comprising an interface engine 112 is configured to receive inputs from the user at the interface, and in turn to communicate information to the data warehouse 110. In response to receipt of that information, the data warehouse may manipulate (e.g. edit, create) the stored data, and may eventually return the stored data to the interface engine, which in turn communicates it to the user via the interface.

Figure 2:
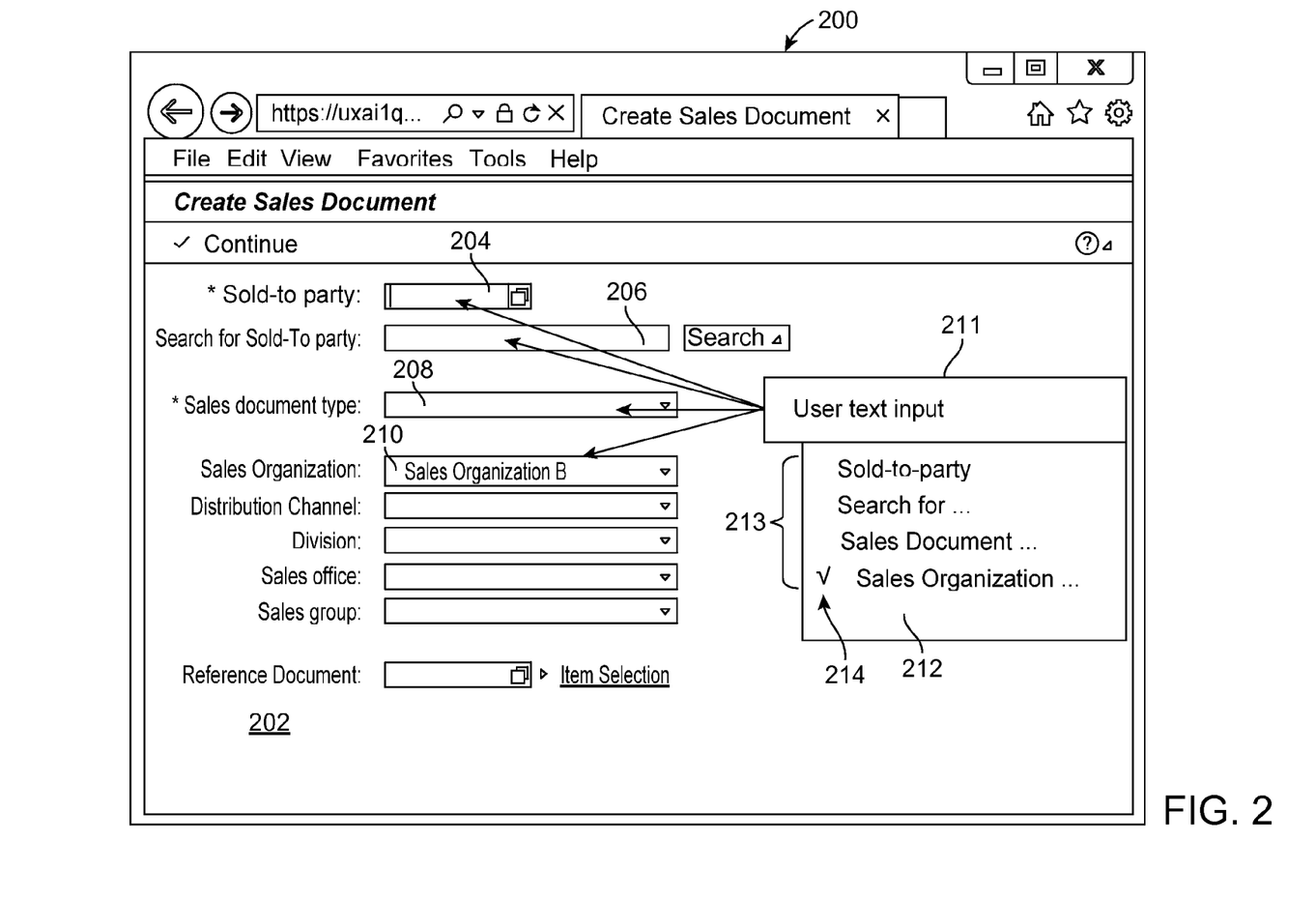
FIG. 2 is a specific screen shot showing an interface according to an embodiment.

FIG. 2 shows an embodiment of a screen shot of an interface 200 according to an embodiment. In particular, a user seeks to enter data into a sales document 202 stored in a data warehouse. The sales document may be complex, comprising various types of information including: a "sold-to-party" 204, information used to search 206 for a "sold-to-party", a sales document type 208, and a sales organization 210.

Certain of these input information types are required, as is indicated on the screen with an asterix (*). Other input information types are optional; those are not indicated with an asterix.

According to various embodiments, the interface may include a single, generic input field 211. This input field is configured to receive a text input from the user, and in response provide a drop-down menu 212 providing a list 213 of the various input types available in the document.

In certain embodiments, required input information types could be delineated in the list. For example, in some embodiments the required input information types could be differentiated from optional input types by a different font size and/or type, by italics or underlining, and/or by colored text and/or background highlighting.

Using his or her input device, the user may select from the choices of available input information types shown in the drop down menu. Having selected an input information type, the user may then provide the particular value for that input type to the interface via the generic input field.

The user interface approach according to particular embodiments as described above, may be contrasted with conventional approaches. In particular, conventional interfaces may typically feature a plurality of different information types, each of which is accessed through a corresponding plurality of different input fields. The user is thus forced to separately navigate to each of those individual input fields in order to enter relevant values. And while each of the plurality of input fields of a conventional interface may include a drop menu, that drop menu offers the user a choice between different values (e.g. A, B, C) of a particular input type (e.g. Sales Organization).

By comparison the drop menu of embodiments as described herein, may allow the user to choose between different input information types. Thus only a single input action (e.g. keystroke, click) in one (the generic) input field, is required in order to select the input information type.

In certain embodiments, once a value for an input information type has been entered, that input information type may be so-designated in any future list provided by the single input field. For example, an icon (e.g. the check-mark 214 in FIG. 2) may thereafter be displayed next to the input information type, in order to indicate its previous entry by a user. This displayed icon could serve as a reminder, rather than precluding the user from re-accessing that particular input information type (e.g. for revision or deletion).

Once the value for the input information type has been entered, the interface may then allow the user to select and enter appropriate values for another input information type available in the document.

Example

Figure 3:
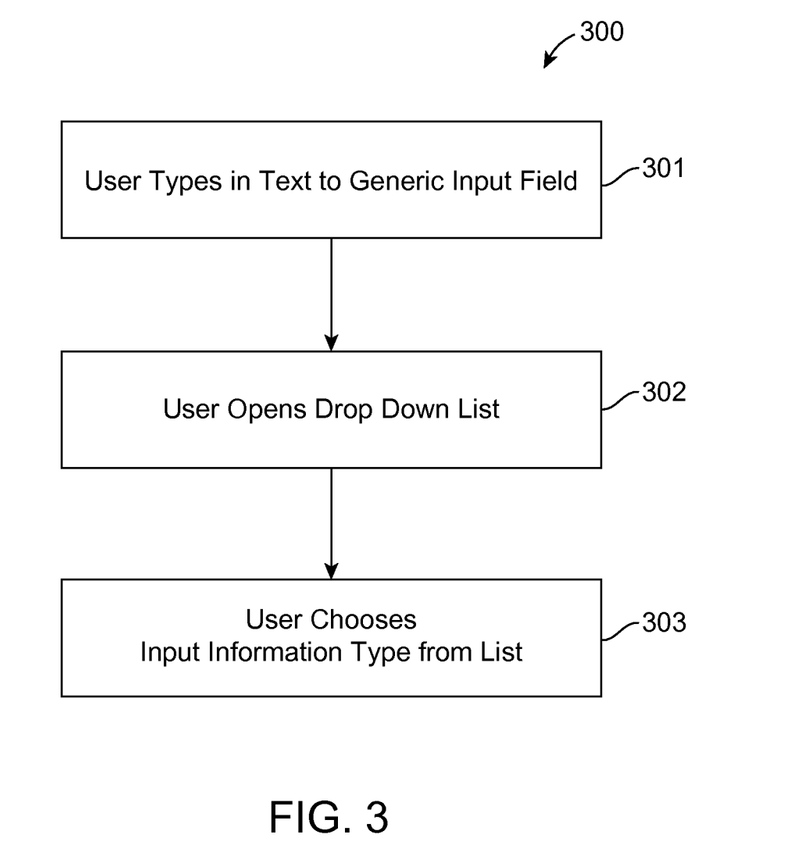
FIG. 3 is a simplified flow diagram illustrating an embodiment of a method featuring user interaction with an interface comprising a generic input field.
Figure 4:
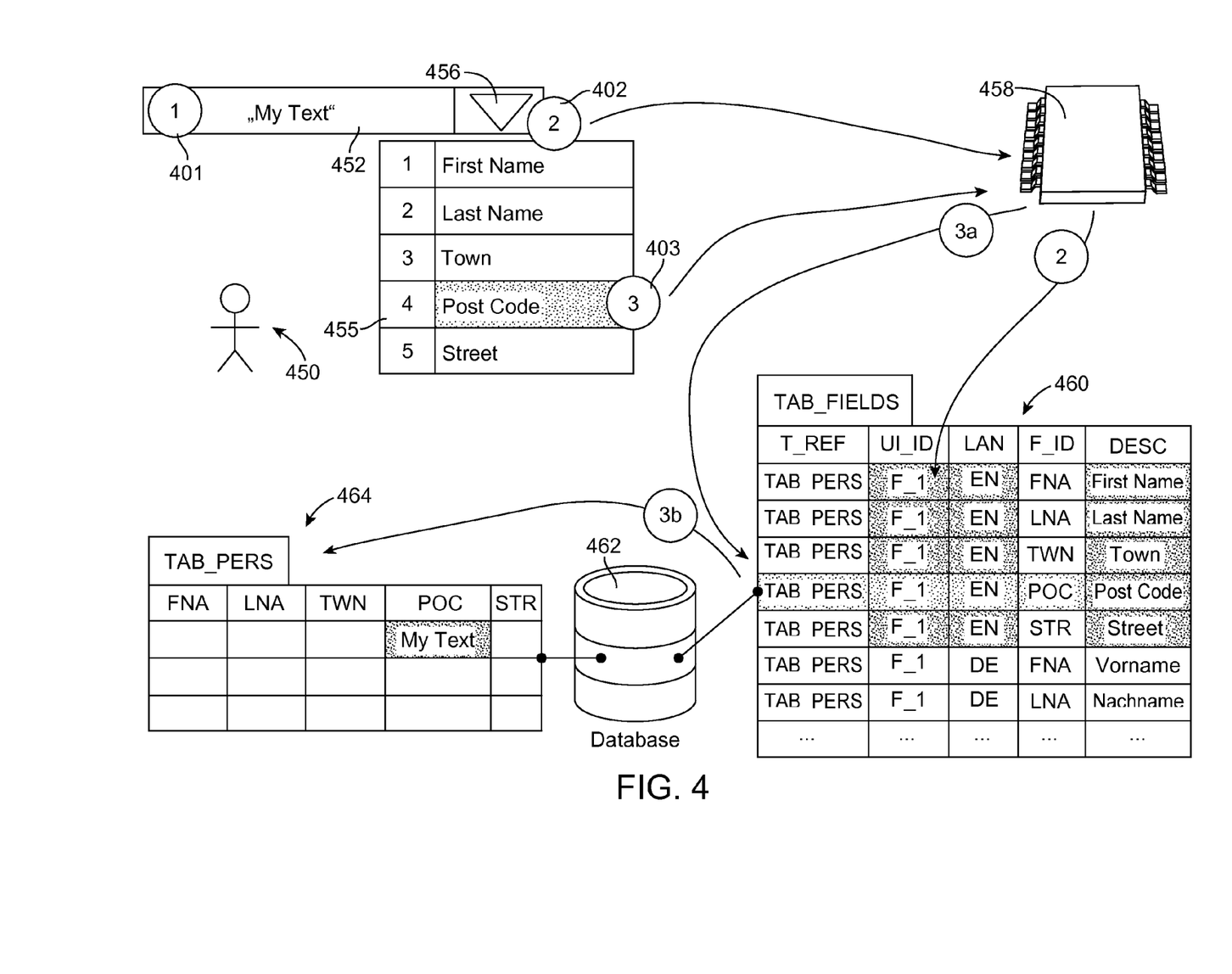
FIG. 4 illustrates the interaction of various elements in the method of FIG. 3.

FIG. 3 is a simplified flow diagram illustrating an embodiment of a method featuring user interaction with an interface comprising a generic input field. FIG. 4 illustrates the interaction of various elements in the method of FIG. 3.

In particular, in a first step 301 of method 300, a user 450 accesses the generic input field 452 and types in text ("My Text"). The generic input field has a user identification code associated therewith: (UI_ID)="F_1".

In a second step 302, the user opens a drop down list by clicking the drop down icon (▼) 456. In response to this input, the interface engine 458 is triggered to execute the following routine: "FETCH_FIELD_NAMES_FROM_DB".

---
SELECT DESC FROM TAB_FIELDS
WHERE    UI_ID = „F_1" AND
              LAN = „EN"
---

Pursuant to this routine, the interface engine 458 communicates with the TAB_FIELDS table 460 of the database (DB) 462. The table TAB_FIELDS is a definition table filled in at design time. The columns have the following purpose/meaning:

The T_REF column specifies the reference to another database table (here: TAB_PERS).

The UI_ID column specifies the ID of an input field on the user interface.

The LAN column is the language identifier.

The F_ID column is reference to a column in the database table T_REF.

The DESC column is a description/text populating the drop down menu in field with UI_ID.

The interface engine 458 thus communicates with the TAB_FIELDS table 460, in order to fetch values for the drop down list. In particular, the values in column "DESC" of the table TAB_FIELDS is selected. The selection criteria have to match the value of UI_ID (here: F_1) and the chosen language. Thus in this example, the SELECT would return the following five (5) values: "First Name", "Last Name", "Town", "Post Code" and "Street". These five values are used to populate the drop down menu.

In response to execution of this "FETCH_FIELD_NAMES_FROM_DB" routine, the interface engine in turn causes the drop down menu of the interface to display the names of input information types available from the database.

Here, the target document includes input information of the following types: First Name, Last Name, Town, Post Code, and Street.

To retrieve the data for the same field in another language (example here: German), a system setting would be activated to switch the language. This can be either done by an administrator setting the language, or this could be done when the user is logging on to the system and selecting his/her language at the logon screen.

FIG. 4 shows that each of the types of input information is accompanied by an associated index 455. However, these index values are not displayed to the user as part of the dropdown list.

In a third step 303, the user selects the particular input information type from the dropdown list, for which values are to be entered. For example, clicking "Post Code" causes the interface engine to execute the following routine: "enter value into DB".

```
SELECT F_ID, T_REF FROM TAB_FIELDS
WHERE   UI_ID = „F_1" AND
        LAN = „EN" AND
        INDEX = 4
```

Pursuant to this routine, the interface engine 458 communicates with the TAB_FIELDS table 460 of the database (DB) 462, in order to fetch values for the drop down list. Specifically, the data in columns "F_ID" and "T_REF" are fetched from table TAB_FIELDS. The selection criteria are now UI_ID (here: F_1), the chosen language, and the index=4. The goal is to retrieve an identifier for the target column in the other table where the user input will be written to. The system returns now two values:

T_REF="TAB_PERS"
F_ID="POC"

In response to execution of this "enter value into DB" routine, the interface engine in turn causes the text typed into the generic input field to be entered into the field F_1 in the column having the ID "POC" of the table TAB_PERS 464 of the database 462.

Specifically, the table TAB_PERS holds data of personal information, and is filled via user input. The meaning of the columns in the table TAB_PERS is as follows:

FNA: First Name;
LNA: Last Name;
TWN: Town;
POC: Post Code;
STR: Street.

To summarize, interfaces according to various embodiments may employ a sequence of user actions to enter information that includes one or more of the following steps:

navigating to the single generic input field on a screen (e.g. using a mouse, touchscreen, or touchpad);

inputting the data into the single generic input field;

providing an appropriate input (e.g. via a mouse click or TAB key) to open a dropdown menu with a list of possible input types;

selecting the appropriate input type for the input (e.g. using arrow keys, touchpad, touchscreen, mouse);

providing an input (e.g. using touchpad, touchscreen, mouse, or key) to trigger insertion of the text to the appropriate location in the document; and repeating the above steps to enter information for successive types of input information.

Embodiments may offer various benefits. For example, certain embodiments may reduce an amount of manual activity by a user to enter information. Rather than being required to navigate to a plurality of fields in different locations, a user may enter information into a single, generic input field.

Figure 5:
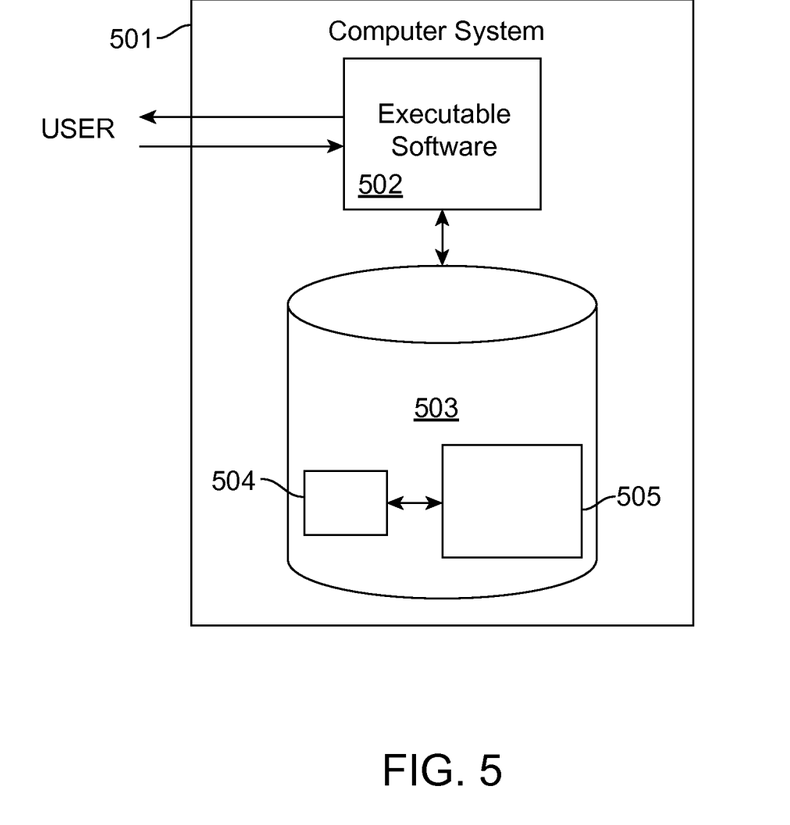
FIG. 5 illustrates hardware of a special purpose computing machine configured with a user interface according to an embodiment.

FIG. 5 illustrates hardware of a special purpose computing machine configured to provide a user interface according to an embodiment. In particular, computer system 500 comprises a processor 502 that is in electronic communication with a non-transitory computer-readable storage medium 503. This computer-readable storage medium has stored thereon code 505 corresponding to an interface engine. Code 504 corresponds to a database application including different types of input information available thereto. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
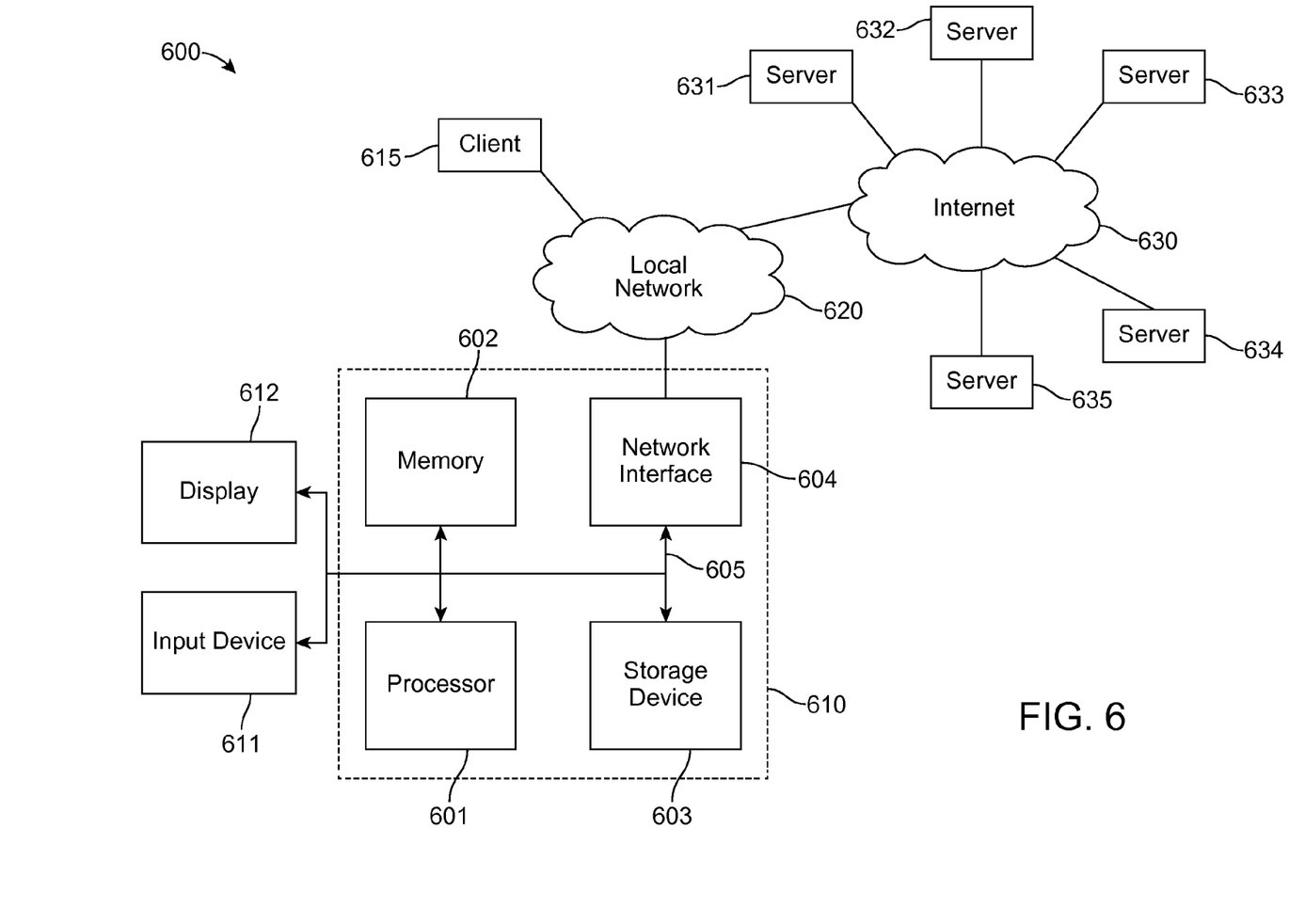
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    providing an interface engine in communication with a stored document comprising a database table including a first column comprising a plurality of available input information types corresponding to respective display fields, and a second column corresponding to a selected human language;
    causing the interface engine to display a single input field on a screen;
    in response to a first input to the single input field, causing the view engine to reference the database table and display a list in the selected human language of the plurality of available input information types in the single input field, wherein the interface engine displays a text of a required input information type in the list, in a manner different from an optional input information type, and displays an icon next to previously-selected input information types of the list; and
    in response to a second input to the list, causing the interface engine to enter information relating to a particular input information type into the corresponding display field of the stored document.

2. A method as in claim 1 wherein the interface engine displays the required input information type in the list, in a color different from the optional input information type.

3. A method as in claim 1 wherein the single input field comprises a drop arrow, and the first input comprises selecting the drop arrow.

4. A method as in claim 1 wherein the user accesses the input field via a touchscreen.

5. A non-transitory computer readable storage medium embodying a computer program for performing a method, said method comprising:
    providing an interface engine in communication with a stored document comprising a database table including a first column comprising a plurality of available input information types corresponding to respective display fields, and a second column corresponding to a selected human language;
    causing the interface engine to display a single input field on a screen;
    in response to a first input to the single input field, causing the view engine to reference the database table and display a list in the selected human language of the plurality of available input information types in the single input field, wherein the interface engine displays a text of a required input information type in the list, in a manner different from an optional input information type, and displays an icon next to previously-selected input information types of the list; and
    in response to a second input to the list, causing the interface engine to enter information relating to a particular input information type into the corresponding display field of the stored document.

6. A non-transitory computer readable storage medium as in claim 5 wherein the interface engine displays the required input information type in the list, in a color different from the optional input information type.

7. A non-transitory computer readable storage medium as in claim 5 wherein the single input field comprises a drop arrow, and the first input comprises selecting the drop arrow.

8. A non-transitory computer readable storage medium as in claim 5 wherein the user accesses the input field via a touchscreen.

9. A computer system comprising:
    one or more processors;
    a software program, executable on said computer system, the software program configured to:
    provide an interface engine in communication with a stored document comprising a database table including a first column comprising a plurality of available input information types corresponding to respective display fields, and a second column corresponding to a selected human language;
    cause the interface engine to display a single input field on a screen;
    in response to a first input to the single input field, cause the view engine to reference the database table and display a list in the selected human language of the plurality of available input information types in the single input field, wherein the interface engine displays a text of a required input information type in the list, in a manner different from an optional input information type, and displays an icon next to previously-selected input information types of the list; and
    in response to a second input to the list, cause the interface engine to enter information relating to a particular input information type into the corresponding display field of the stored document.

10. A computer system as in claim 9 wherein the interface engine displays the required input information type in the list, in a color different from the optional input information type.

11. A computer system as in claim 9 wherein the single input field comprises a drop arrow, and the first input comprises selecting the drop arrow.

* * * * *